March 19, 1963  W. A. THORNTON, JR  3,082,344
METHOD FOR IMPROVING ELECTROLUMINESCENT
PHOSPHOR AND ELECTROLUMINESCENT LAMP
Filed Sept. 28, 1960
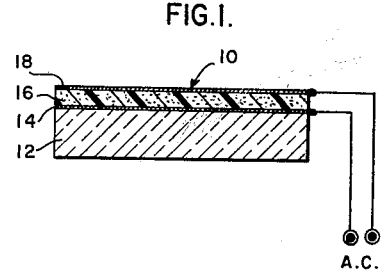
FIG. I.
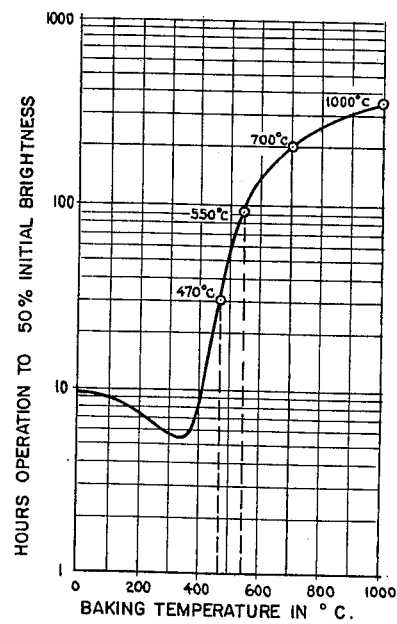
FIG. 2.
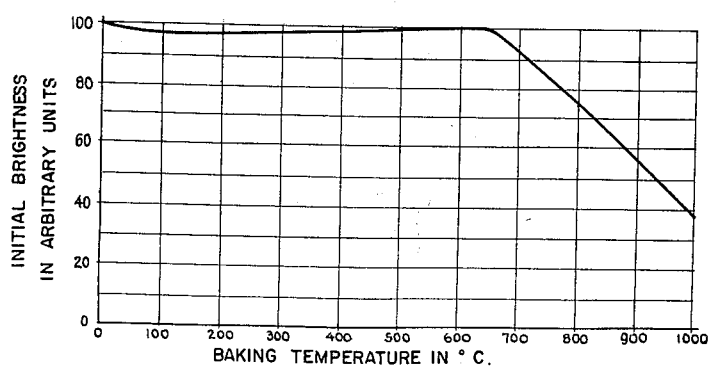
FIG. 3.
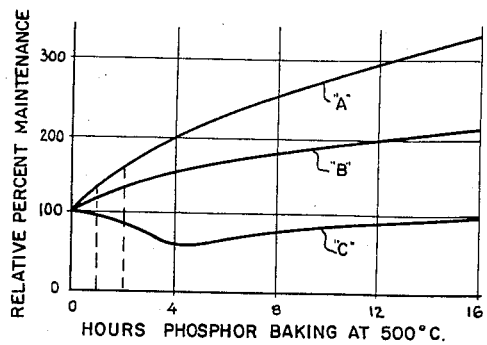
FIG. 4.
INVENTOR.
WILLIAM A. THORNTON, Jr.
BY
W. D. Palmer
ATTORNEY.

United States Patent Office 3,082,344
Patented Mar. 19, 1963

3,082,344
METHOD FOR IMPROVING ELECTROLUMINESCENT PHOSPHOR AND ELECTROLUMINESCENT LAMP
William A. Thornton, Jr., Cranford, N.J., assignor to Westinghouse Electric Corporation, East Pittsburgh, Pa., a corporation of Pennsylvania
Filed Sept. 28, 1960, Ser. No. 58,979
10 Claims. (Cl. 313—108)

This invention relates to a method for improving electroluminescent phosphor and, more particularly, to a method for improving the maintenance of light emission and performance of electroluminescent phosphor and an electroluminescent lamp which incorporates such improved phosphor. This application is a continuation-in-part of applications S.N. 29,431, filed May 16, 1960, and S.N. 782,829, filed December 24, 1958, both owned by the present assignee.

The phenomenon of electroluminescence was first disclosed by G. Destriau, one of his earlier publications appearing in London, Edinburgh and Dublin Philosophical Magazine, Series 7, volume 38, No. 285, pages 700–737 (October 1947). The maintenance of light output or emission of electroluminescent phosphors has constituted a problem for if electroluminescent lamps are operated with any appreciable brightness, the light output decreases fairly rapidly. In addition, the brightness of electroluminescent lamps is comparatively poor as compared to many other types of light sources.

It is disclosed in British Patent No. 718,804, published November 17, 1954, to improve the response of an electroluminescent phosphor by further firing at a temperature between 200° C. to 400° C. for a period of from ten to sixty minutes, with the preferred firing atmosphere being reducing in nature. It is also disclosed in U.S. Patent No. 2,745,811, dated May 15, 1956, to increase the brightness of electroluminescent phosphors by using plural firing procedures. Such a practice is also known for fluorescent lamp phosphors. It is disclosed in U.S. Patent No. 2,731,423, dated January 17, 1956, to refire electroluminescent phosphors at a temperature of 1150° C. in an air atmosphere for a period of thirty minutes, in order to enhance the electroluminescent effect. It has also been disclosed in Philips Research Report, 9, 81–108, April 1954, to refire electroluminescent phosphor for a few minutes in an air atmosphere at a temperature of 550° C. None of the foregoing techniques are reported or are known to improve the maintenance of light emission or so-called lumen maintenance of electroluminescent lamps.

It is the general object of this invention to avoid and overcome the foregoing and other difficulties of and objections to prior-art practices by the provision of a method for improving the performance and particularly the maintenance of light emission of electroluminescent phosphor.

It is another object to provide an electroluminescent lamp having improved performance and particularly improved maintenance of light emission, wherein the phosphor used in the lamp has been further processed in accordance with the present invention.

It is a further object to provide process details for improving the performance and particularly the maintenance of light emission of activated zinc sulfide electroluminescent phosphor.

The aforesaid objects of the invention, and other objects which will become apparent as the description proceeds, are achieved by providing an additional processing step for electroluminescent phosphor, wherein the fired phosphor is baked at a temperature of from 470° C. to 1000° C., and preferably from 550° C. to 700° C., for a period of at least about one hour, and preferably at least about two hours, in an atmosphere comprising oxygen and preferably air. Thereafter, for best results, the baked phosphor is rapidly cooled by quenching in air. In addition, there has been provided an electroluminescent lamp which incorporates the improved phosphor.

For a better understanding of the invention, reference should be had to the accompanying drawing wherein:

FIG. 1 is a sectional elevational view of an electroluminescent lamp incorporating the improved phosphor of this invention;

FIG. 2 is a graph of hours' operation, required to decrease by one-half the initial light output, versus phosphor baking temperature;

FIG. 3 is a graph of lamp initial brightness versus phosphor baking temperature;

FIG. 4 is a graph of relative percent maintenance of light emission versus phosphor baking time at a temperature of 500° C., illustrating the improved maintenance of light emission obtained with prolonged baking periods as well as the improved performance which is obtained from using an air-quench cooling of the baked phosphor, and also illustrating the deleterious effects which are encountered with a baking atmosphere other than one comprising oxygen.

With specific reference to the form of the invention illustrated in the drawing, in FIG. 1 is illustrated an electroluminescent lamp 10 which generally comprises a glass foundation 12 having coated thereon a light-transmitting first electrode 14, which can be formed of tin oxide. Coated over the first electrode 14 is a layer 16 comprising electroluminescent phosphor and coated over the layer 16 is a second electrode 18, which can be formed of vacuum-metallized aluminum or copper iodide for example. An alternating potential is adapted to be applied between the electrodes 14 and 18 in order to energize the electroluminescent phosphor to light emission.

The tin oxide electrode layer 14 can be formed of other suitable light-transmitting, electrically conducting material, such as indium or titanium oxides or copper iodide, for example. In this specific example the phosphor, which has been processed as explained hereinafter, is mixed with equal parts by weight of a light-transmitting dielectric such as polyvinyl-chloride acetate and the thickness of the layer 16 is approximately 2 mils. This thickness is not critical and can be varied considerably. If desired, a separate layer of dielectric can be included between the electrodes 14 and 18 or the dielectric can be dispensed with entirely and powdered phosphor compacted between the lamp electrodes without any mixed dielectric. Either or both of the electrodes 14 or 18 can be replaced by a mesh of wires or the lamp can be formed as an interlacing mesh of wires with phosphor therebetween, such as disclosed in U.S. Patent No. 2,684,450, dated July 20, 1954.

The electroluminescent phosphor comprising the layer 16 is first prepared in accordance with conventional techniques such as by firing a mixture of zinc sulfide to provide the phosphor matrix, copper salt to provide the phosphor activator, and chloride, bromide, iodide or aluminum salt to provide the phosphor coactivator. The firing atmosphere is generally inert and preferably is also sulphurizing and the firing temperature is from 800° C. to 1100° C., for example. The phosphor raw mix is fired for at least ten minutes, with the lower the firing temperature the longer the firing time. The copper in the phosphor raw mix can be present in amount of from 0.1% to 10 mole percent of the zinc sulfide. The total activator halogen or aluminum in the raw mix can comprise from 0.01 to 10 gram-atom percent of the zinc. If desired, the halogen or aluminum coactivators can be utilized together in any proportions, such as by using equal atom proportions of bromine and chlorine in the phosphor raw mix. The preferred phosphor coactivator is chlorine. The phosphor after firing thus comprises a matrix of zinc sulfide activated by copper and coactivated by any of the indicated materials. Other coactivators can be used, as is well known. Small amounts of impurities such as zinc oxide can be tolerated in the phosphor, as well as other impurities.

As a specific example, the electroluminescent phosphor used in the layer 16 is a green-emitting phosphor comprising zinc sulfide activated by copper with a chlorine coactivator. Such a phosphor is prepared by mixing 1000 grams of zinc sulfide with 30 grams sulphur, 12.8 grams copper acetate and 4.5 grams ammonium chloride. This mixture is fired in a partially closed container in a nitrogen atmosphere at a temperature of about 950° C. for about 100 minutes. Thereafter the phosphor is slightly crushed, 30 grams of sulphur are added to the phosphor and it is refired in a similar manner. After final firing, the phosphor is again crushed to finely divided status. The degree of crushing is not critical, but as an example, the average phosphor particle diameter is twelve microns. The foregoing phosphor preparation steps are generally conventional and other firing atmospheres such as a mixture of nitrogen, hydrogen sulfide and hydrogen chloride can be substituted for the preferred firing atmosphere. As is well known, in order to produce zinc sulfide-type electroluminescent phosphors having optimum performance characteristics, it is necessary to incorporate copper in the raw mix in excess of that amount of copper which is ultimately desired to be retained. The foregoing phosphor after firing will have a dark body color and while it will be electroluminescent, it is customary and desirable to wash the phosphor in a material or solution which is a good solvent for cuprous sulfide, but which is not a good solvent for zinc sulfide. The usual solvent solution which is used to dissolve excess cuprous sulfide is an alkali cyanide aqueous solution, such as a 10% by weight sodium cyanide solution, made alkaline with 5% by weight of sodium hydroxide in order to inhibit tendencies to form hydrogen cyanide. As a specific example, the phosphor is boiled for a period of ten minutes in the foregoing sodium cyanide solution, thereafter it is water washed and then dried by rinsing with ethanol. Other cuprous-sulfide solvents can be used, such as aqueous solutions of potassium or ammonium cyanide; sodium, potassium or ammonium thiosulphate; or sodium, potassium or ammonium thiocyanate, for example, or mixtures of the foregoing. The concentration of these washing solutions and the washing conditions have not been found to be critical although the stronger the solution, the shorter the washing time required.

In accordance with the present invention, the phosphor is further processed by baking, either before or after it is washed with cuprous sulfide solvent as specified above. Preferably the phosphor is additionally baked after final firing and crushing and before it is washed with the cuprous sulfide solvent. In FIG. 2 is shown a graph of hours of operation, required to decrease the light output for test lamps to 50% of initial brightness, versus phosphor baking temperature. The curve as shown in FIG. 2 was plotted from data taken using test lamps incorporating the green-emitting electroluminescent phosphor as described hereinbefore, but baked for two hours at the different indicated temperatures. The test lamps were constructed as shown in FIG. 1 and in order to expedite testing, the lamps were operated at a potential of 150 volts and a frequency of 4000 cycles. After baking at the indicated temperatures, the test phosphor lots were washed with the cuprous-sulfide solvent and incorporated into the test lamps. As shown in FIG. 2, below a baking temperature of 400° C., the lumen maintenance of the lamps is impaired. In order to achieve any appreciable improvement in lumen maintenance, the phosphor should be baked at a temperature of from 470° C. to 1000° C. in the atmosphere comprising oxygen. The preferred phosphor baking temperature is from 550° C. to 700° C.

In FIG. 3 is shown the effect of baking temperature on lamp initial brightness, expressed in arbitrary units. There is substantially no change in initial brightness up to a temperature of approximately 625° C., after which the lamp initial brightness drops off quite rapidly. Considering the performance curves as shown in FIGS. 2 and 3, it is seen that the optimum baking temperature is approximately 625° C. At this temperature, the lamp initial brightness is essentially unaffected and good lumen maintenance is obtained. In addition, the higher the baking temperature in the atmosphere comprising oxygen, the greater the tendency to form zinc oxide and some free zinc. In the case of a 1000° C. bake for a period of at least about one hour, a considerable portion of the zinc sulfide will be oxidized to form poorly- or non-electroluminescent zinc oxide. Substantially all of this must be removed to produce a good electroluminescent phosphor. If a very high baking temperature is used, such as 800° C. to 1000° C., the surface layer of formed zinc oxide can be scraped off and the residual zinc sulfide phosphor thereafter washed in a very strong alkali cyanide solution, such as an aqueous solution including 40% sodium cyanide and 20% sodium hydroxide. This very strong alkali cyanide solution is a good solvent for cuprous sulfide and is also a solvent for zinc oxide and free zinc.

As an alternative method for processing in accordance with the present invention, the phosphor after final firing can be washed in the cuprous sulfide solvent in order to remove excess cuprous sulfide to whiten the body color of the finely divided material. Thereafter, an additional small amount of copper in compound form can be deliberately added to the phosphor. As an example, the copper is added as an aqueous solution of cupric acetate, cupric sulfate, copper ammonium sulfate or copper borate. If the phosphor is to be embedded in a plastic dielectric material when incorporated into a lamp, the amount of added copper compound does not appear to be critical and beneficial effects have been found with additions of from 0.05% up to 2.5% by weight of copper. After the copper addition, such as 0.1% by weight of copper as acetate, the phosphor is baked as described. Thereafter the phosphor is washed with the cuprous sulfide solvent as outlined above to complete the phosphor processing. The lumen maintenance of the resulting phosphor is equivalent to that obtained with the first phosphor processing procedure as described.

As a third alternative method for processing, the phosphor after firing can be washed in the cuprous sulfide solvent and then baked as described above, without the addition of any copper in compound form. With such a processing technique, it is not necessary to wash the phosphor after baking to remove excess cuprous sulfide, as the phosphor will have a white body color both before and after baking. The phosphor when so processed is somewhat more sensitive to higher baking temperatures, such as greater than 650° C. The phosphor lumen maintenance is still improved to some degree, however, even at baking temperatures approaching the upper end of the foregoing range.

In FIG. 4 is plotted relative maintenance of output after 350 hours of operation, using the lumen maintenance of a lamp incorporating an otherwise-similar but unbaked phosphor as a 100% standard, versus hours of baking. The phosphors used in preparing the lamps from which these curves were prepared were baked at 500° C. Similar results are obtained when using other baking temperatures as indicated. The baking atmosphere was air for the curves designated "A" and "B" and nitrogen for the curve designated "C." As shown in FIG. 4, the phosphor should be baked for a period of at least about one hour in order to realize any appreciable improvement in lumen maintenance. The preferred baking period is at least about two hours. No upper limitation to the baking period has been observed, except that very prolonged baking periods tend to form greater amounts of free zinc and a zinc oxide. Such greater amounts of free zinc and zinc oxide can be readily removed by using a stronger cyanide wash, such as described hereinbefore. The curve designated "A" in FIG. 4 illustrates the beneficial effects of an air quench in cooling the baked phosphor, which air quench results in approximately a 100% improvement in maintenance over the phosphor which has been slowly cooled in air, as shown in curve "B." It is not necessary to cool the phosphor in an atmosphere comprising oxygen provided the phosphor has been baked in such an atmosphere, but for best results the baked phosphor should be quench-cooled by exposing it to a room-temperature atmosphere comprising oxygen, and preferably air. Baking and cooling the phosphor in a nitrogen atmosphere has a deleterious effect on maintenance, as shown in curve "C" in FIG. 4.

In the following table, designated Table I, are indicated the effects of different baking atmospheres on lumen maintenance after 350 hours' operation. These lumen maintenance figures are compared to the lumen maintenance of a similar control lamp incorporating a phosphor which was not processed by baking. All of the bakes in the various atmospheres were for a period of one hour at a temperature of 500° C. and a pressure of one atmosphere, except for the steam atmosphere which was at a pressure in the order of 100 atmospheres and the vacuum which was in the order of $10^{-7}$ atmosphere at seal-off.

*Table I*

| Atmosphere: | Percent maintenance relative standard |
|---|---|
| Air | 300 |
| Oxygen | 150 |
| Sulphur | [1] 100 |
| Nitrogen | 70 |
| H$_2$S | 50 |
| Steam | 40 |
| Vacuum | 30 |
| Hydrogen | 20 |

[1] No effect.

As seen from the foregoing table, only atmospheres comprising oxygen have a beneficial effect with respect to improving the lumen maintenance. In addition, the concentration of the oxygen in the baking atmosphere is not critical and can be varied over a wide range, although the oxygen concentration which is present in air apparently at least approaches optimum for best improvement of the maintenance of light emission. Lower oxygen concentrations such as a baking atmosphere comprising 90% nitrogen and 10% oxygen can be used, however, to improve the performance and particularly the lumen maintenance of the phosphors.

While the curves shown in FIGS. 2–4 have been presented for a specific green electroluminescent phosphor, other electroluminescent phosphors when processed in the manner as indicated and operated under similar conditions will behave in a similar fashion, particularly with respect to the improved maintenance of light emission. Best improvement has been obtained with zinc-sulfide electroluminescent phosphors which are activated by copper, as specified hereinbefore. Electroluminescent phosphors are also known which incorporate additional primary activators to supplement the copper activator, such as zinc sulfide phosphor which is activated by copper and manganese and coactivated by chlorine for example. Such other phosphors will display improved maintenance of light emission when processed in accordance with the present invention and for a specific example of a zinc sulfide electroluminescent phosphor which is activated by copper and manganese and coactivated by chlorine and other zinc sulfide phosphors activated only by copper, reference is made to copending application S.N. 732,510, filed May 2, 1958, by W. A. Thornton, the inventor herein, and owned by the present assignee, now Patent No. 2,972,692, dated February 21, 1961. Other material such as zinc selenide can be used to supplement the zinc sulfide as a part of the phosphor matrix. The phosphor which is processed in accordance with the present invention thus at least principally comprises zinc sulfide as matrix.

The efficiency of the lamps incorporating phosphors baked in accordance with the present invention may be decreased somewhat from the initial efficiency which is realized with lamps incorporating the usual unbaked electroluminescent phosphors. The maintenance of efficiency of lamps incorporating the baked phosphors is normally better than the otherwise-similar lamps incorporating the unbaked phosphors. If care is taken to remove substantially all free zinc and zinc oxide which may be formed during the baking process, however, the initial efficiency of the lamps incorporating the baked phosphor appears to be substantially equivalent to the control lamps incorporating the unbaked phosphor.

As a possible further processing step, the baked phosphors which have been washed in the cuprous sulfide solvent, such as sodium cyanide, can be additionally washed with a hot acetic acid solution in order to remove all possible traces of zinc oxide and free zinc. As an example, one part by weight of the phosphor can be mixed with three parts by weight of two-normal acetic acid and the mixture boiled for fifteen minutes. Thereafter the acid is decanted and the phosphor rinsed with water and then acetone and dried. The concentration of the acid wash, the relative parts by weight of phosphor to acid in the wash and the acid wash temperature and washing time are not critical and can be varied considerably.

The electroluminescent lamp as illustrated in FIG. 1 incorporates a plastic dielectric and such dielectrics are preferred for best initial brightness. The plastic dielectric can be replaced by a ceramic dielectric, as is well known in the electroluminescent art. For best improvement of lumen maintenance with ceramic-type lamps, it is preferred to modify the present phosphor processing steps. As a detailed example, the phosphor is first initially prepared as outlined hereinbefore by firing the raw mix constituents. Thereafter the fired phosphor is washed with the solution which is a good solvent for cuprous sulfide but which is not a good solvent for zinc sulfide, with the specified aqueous alkali cyanide wash preferred. The washed phosphor is then separated from the washing solution by filtering and water rinsing. Copper in compound form is added to the washed phosphor in amount of from $1 \times 10^{-4}$ to $1 \times 10^{-6}$ part by weight of the phosphor. The preferred addition of copper, added in compound form, is $2 \times 10^{-5}$ part by weight of the phosphor. As an example, the copper is added to the phosphor as an aqueous cupric acetate solution. The phosphor and added cupric acetate are dried with the residual cupric acetate distributed throughout the phosphor in the indicated amount. The phosphor is then baked as specified hereinbefore, namely, at from 470° C. to 1000° C. for a period of at least about one hour in an atmosphere comprising oxygen, with the preferred baking temperature being from 550° C. to 700° C. for a period of at least about two hours. The baked phosphor is preferably cooled by quenching in air. The completely processed phosphor is then incorporated into the ceramic-type electroluminescent lamp in accordance with conventional practices. Specific examples for fabricating ceramic-type electroluminescent lamps are given in detail in copending applications S.N. 816,404, filed May 28, 1959, and S.N. 816,405, filed May 28, 1959, both owned by the present assignee.

Test ceramic-type lamps which incorporated the foregoing preferred copper addition displayed a relative percent maintenance of initial light output which was more than three-fold greater than control ceramic-type lamps incorporating otherwise-similar phosphors which were merely fired and then washed in accordance with the usual practices of the prior art.

It will be recognized that the objects of the invention have been achieved by providing a method and method details for improving the performance and particularly the lumen maintenance of fired, activated zinc-sulfide electroluminescent phosphor. There has also been provided an electroluminescent lamp which incorporates the improved phosphor and which lamp displays improved performance and particularly improved lumen maintenance.

While best embodiments of the invention have been illustrated and described in detail, it is to be particularly understood that the invention is not limited thereto or thereby.

I claim:

1. The method of improving the performance obtainable from finely divided electroluminescent phosphor at least principally comprising zinc sulfide as matrix and including copper as activator and which phosphor has been rendered electroluminescent by firing the phosphor raw-mix constituents in a sulphurizing atmosphere at a temperature of from 800° C. to 1100° C. for at least 10 minutes, with the lower the firing temperature the longer the firing time, which method comprises, baking the phosphor at a temperature of from 470° C. to 1000° C. for a period of at least about one hour in an atmosphere comprising oxygen.

2. The method of improving the performance obtainable from finely divided electroluminescent phosphor at least principally comprising zinc sulfide as matrix and including copper as activator and which phosphor has been rendered electroluminescent by firing the phosphor raw-mix constituents in a sulphurizing atmosphere at a temperature of from 800° C. to 1100° C. for at least 10 minutes, with the lower the firing temperature the longer the firing time, which method comprises, baking the phosphor at a temperature of from 470° C. to 1000° C. for a period of at least about one hour in an atmosphere comprising oxygen, cooling said phosphor, and thereafter washing said cooled phosphor with a material which is a good solvent for cuprous sulfide but which is not a good solvent for zinc sulfide.

3. The method of improving the performance obtainable from finely divided electroluminescent phosphor consisting essentially of zinc sulfide as matrix and including copper as activator and which phosphor has been rendered electroluminescent by firing the phosphor raw-mix constituents in a sulphurizing atmosphere at a temperature of from 800° C. to 1100° C. for at least 10 minutes, with the lower the firing temperature the longer the firing time, which method comprises, baking the phosphor at a temperature of from 550° C. to 700° C. for a period of at least about one hour in an atmosphere comprising oxygen, cooling said phosphor, and thereafter washing said cooled phosphor with a solution which is a good solvent for cuprous sulfide but which is not a good solvent for zinc sulfide.

4. The method as specified in claim 3, wherein said phosphor after baking and cooling has removed therefrom at least a substantial portion of any formed free zinc and zinc oxide.

5. The method as specified in claim 3, wherein the solution which is a good solvent for cuprous sulfide, but not a good solvent for zinc sulfide, is also a good solvent for free zinc and zinc oxide.

6. The method as specified in claim 3, wherein the atmosphere comprising oxygen in which said phosphor is baked is an air atmosphere.

7. The method as specified in claim 6, wherein said phosphor is cooled after baking by rapid quenching in an air atmosphere.

8. The method as specified in claim 7, wherein the phosphor washing solution is an aqueous solution of alkali cyanide.

9. The method of improving the performance obtainable from finely divided zinc sulfide electroluminescent phosphor activated by copper and coactivated by at least one of the group consisting of chlorine, iodine, bromine and aluminum, and which phosphor has been rendered electroluminescent by firing the phosphor raw-mix constituents in a sulphurizing atmosphere at a temperature of from 800° C. to 1100° C. for at least 10 minutes, with the lower the firing temperature the longer the firing time, which method comprises, baking said phosphor at a temperature of about 625° C. for at least about two hours in an air atmosphere, cooling said baked phosphor by exposing it to room temperature air, and thereafter washing said phosphor in an alkali cyanide aqueous solution.

10. An electroluminescent lamp comprising, spaced electrodes, material between said spaced electrodes comprising finely divided electroluminescent phosphor at least principally comprising zinc sulfide as matrix and including copper as activator, said phosphor after formation by firing the phosphor raw-mix constituents in a sulphurizing atmosphere at a temperature of from 800° C. to 1100° C. for at least 10 minutes, with the lower the firing temperature the longer the firing time, and before incorporation into said lamp having been further processed by baking at a temperature of from 470° C. to 1000° C. for a period of at least about one hour in an atmosphere comprising oxygen.

References Cited in the file of this patent

UNITED STATES PATENTS

| 2,755,255 | Beutler et al. | July 17, 1956 |
| 2,821,509 | Hunt et al. | Jan. 28, 1958 |
| 2,950,257 | Froelich | Aug. 23, 1960 |
| 2,957,830 | Goldberg et al. | Oct. 25, 1960 |

FOREIGN PATENTS

| 718,804 | Great Britain | Nov. 17, 1954 |
| 745,860 | Great Britain | Mar. 7, 1956 |
| 167,792 | Australia | June 6, 1956 |
| 782,095 | Great Britain | Sept. 4, 1957 |